United States Patent
Noessner et al.

(10) Patent No.: US 10,268,194 B2
(45) Date of Patent: Apr. 23, 2019

(54) METHOD AND SYSTEM FOR ASSISTED EMERGENCY BRAKING

(71) Applicant: Robert Bosch GmbH, Stuttgart (DE)

(72) Inventors: Stephan Noessner, Stuttgart (DE); Heiko Freienstein, Weil der Stadt (DE); Joerg Moennich, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 79 days.

(21) Appl. No.: 15/367,820

(22) Filed: Dec. 2, 2016

(65) Prior Publication Data

US 2017/0176988 A1 Jun. 22, 2017

(30) Foreign Application Priority Data

Dec. 21, 2015 (DE) .................. 10 2015 226 217

(51) Int. Cl.
| | |
|---|---|
| *G05D 1/00* | (2006.01) |
| *G05D 1/02* | (2006.01) |
| *B62D 15/02* | (2006.01) |
| *B60W 30/00* | (2006.01) |
| *B60T 7/22* | (2006.01) |
| *B60Q 1/46* | (2006.01) |
| *B60Q 5/00* | (2006.01) |

(52) U.S. Cl.
CPC .............. *G05D 1/0055* (2013.01); *B60T 7/22* (2013.01); *B60W 30/00* (2013.01); *B62D 15/025* (2013.01); *G05D 1/0214* (2013.01); *G05D 1/0223* (2013.01); *B60Q 1/46* (2013.01); *B60Q 5/00* (2013.01); *B60T 2201/022* (2013.01); *B60T 2201/083* (2013.01); *B60T 2260/00* (2013.01); *B62D 15/027* (2013.01)

(58) Field of Classification Search
None
See application file for complete search history.

(56) References Cited

U.S. PATENT DOCUMENTS

| | | | |
|---|---|---|---|
| 9,815,460 B2 * | 11/2017 | Eigel .................. | B60W 30/08 |
| 9,896,095 B2 * | 2/2018 | Katoh ................. | B60W 30/09 |
| 2016/0071418 A1 * | 3/2016 | Oshida ................ | G08G 1/22 701/23 |
| 2018/0056996 A1 * | 3/2018 | Lee ..................... | B60W 30/09 |

OTHER PUBLICATIONS

Tavvs Fletcher's blog entry/faq titled, "I see a lot of drivers use the shoulder as a passing lane. Isn't this dangerous?", published Apr. 9, 2015, located at: http://www.tavss.com/faqs/risks-of-using-highway-shoulders-as-personal-passing-lane.cfm (Year: 2015).*

* cited by examiner

*Primary Examiner* — Redhwan K Mawari
*Assistant Examiner* — Edward Torchinsky
(74) *Attorney, Agent, or Firm* — Norton Rose Fulbright US LLP; Gerard Messina

(57) ABSTRACT

A method for the assisted emergency braking of a vehicle, in which the lateral and/or the longitudinal guidance of the vehicle are/is influenced in such a way that the vehicle is guided in the direction of a safety zone, and when the safety zone has been reached, a parking position, in particular within the safety zone, is ascertained for the vehicle, the vehicle being guided in such a way that the vehicle comes to a standstill in the parking position.

16 Claims, 4 Drawing Sheets

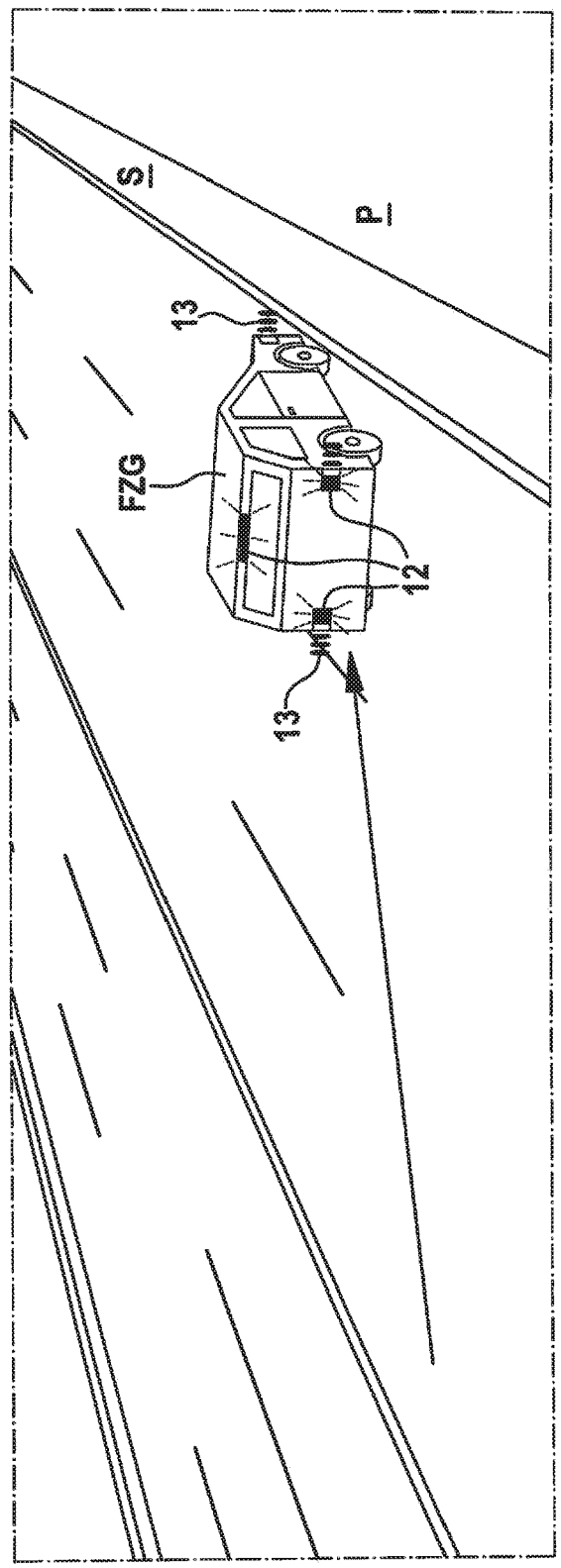

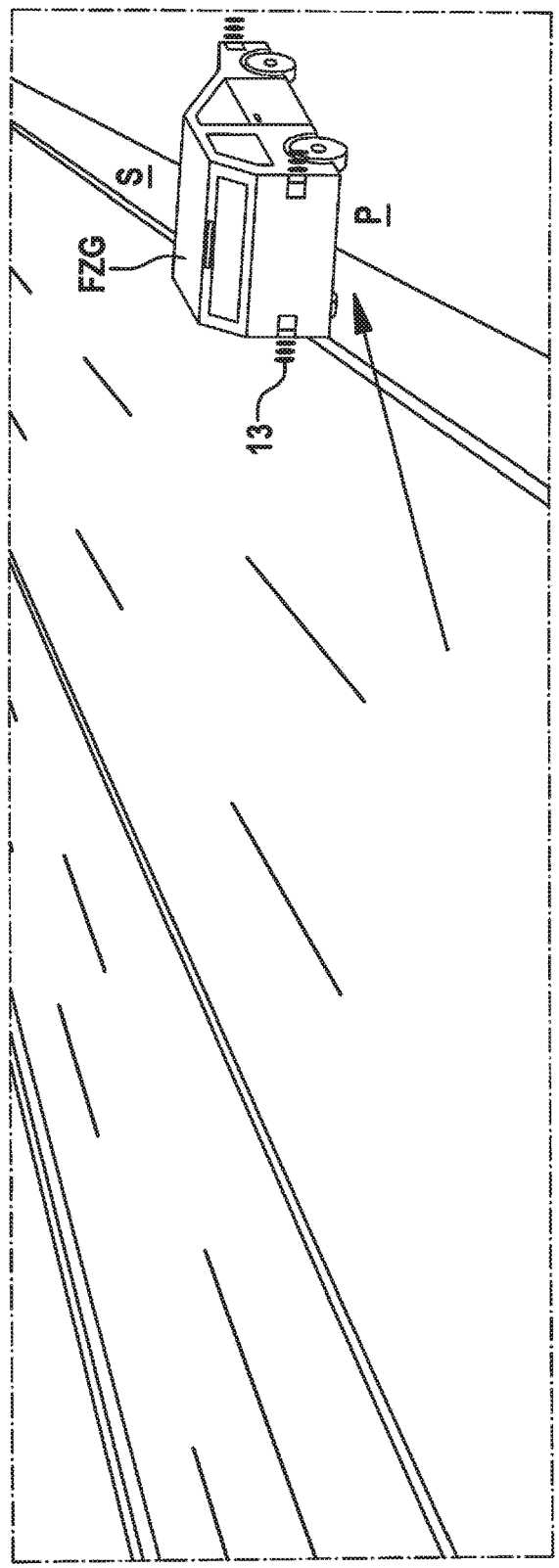

METHOD AND SYSTEM FOR ASSISTED EMERGENCY BRAKING

CROSS REFERENCE

The present application claims the benefit under 35 U.S.C. § 119 of German Patent Application No. DE 102015226217.0 filed on Dec. 21, 2015, which is expressly incorporated herein by reference in its entirety.

BACKGROUND INFORMATION

Conventional assistance systems for vehicles may issue a warning to precondition the brake system or may autonomously decelerate the brake system due to stationary or mobile objects that are situated in the travel envelope.

Conventional emergency brake assistants may automatically decelerate to a standstill on highways, activate the hazard lights and drive onto the emergency stopping lane.

For the most part, systems of this type utilize sensor data from video and/or radar sensor systems for identifying the stopping corridor. Such systems must rely on road markings or road structures and do not function, or function only insufficiently, if no emergency stopping lane or no emergency stopping bay is within reach.

SUMMARY

The present invention provides an example method for assisted emergency braking which selects a parking position that poses the least possible risk for the passengers of the vehicle and the surrounding traffic.

For this purpose, the present method includes influencing the lateral and/or the longitudinal guidance of the vehicle in such a way that the vehicle is guided in the direction of a safety zone, including the advantageous aspect that once the safety zone has been reached, a parking position for the vehicle is ascertained and the vehicle is guided in such a way that the vehicle comes to a standstill in the parking position. The ascertained parking position is advantageously located within the safety zone.

The present invention is based on the recognition that conventional systems do not ascertain potential safe parking positions, or are unable to do so, because such positions are located outside the regions provided for driving by vehicles that are guided in a partially or highly automated manner. The present invention provides a method in which a vehicle that is undergoing assisted braking is first guided away from the road in the direction of a safety zone. As soon as the vehicle has reached the safety zone, a safe parking position is ascertained utilizing all sensor information that is available in the vehicle, for instance. This parking position may then also be an unpaved area adjacent to the road. Examples of such areas are meadows or the bank of the road. Areas such as these are typically not intended for use by vehicles guided in a partially or highly automated manner. Nevertheless, these areas offer sufficient protection for the passengers of the vehicle in an emergency situation. Furthermore, a vehicle that is parked at the greatest possible distance from the road poses the least danger to the other traffic.

Situations that may lead to assisted emergency braking may be at hand when subsequent to (highly) automated or piloted driving, the driver does not assume, or is unable to assume the driving task (in a timely manner), or it may exist if the system recognizes that the driver is no longer able to assume the driving tasks because he has fallen asleep or is suffering from health problems, for example.

It is also possible that the assisted emergency braking is initiated after an operation of a push-button switch or after the detection of a corresponding spoken command or the like. In the same way, the assisted emergency braking could take place through a signal from outside the vehicle, for instance via vehicle-to-vehicle or vehicle-to-infrastructure communications means, such as by the police or similar official authorities for stopping the vehicle.

In the current context, a safety zone may include, among others, the right road shoulder or, in case of left-hand driving, the left road shoulder, the emergency-stopping lane, emergency stop bays, grass strips next to the road or also the unpaved area outside the road.

A parking position in this context refers to a location in which the vehicle can be parked so that the parked vehicle poses the least possible risk to the passengers and the other road users.

This advantageous aspect includes the ability to use parking positions that are not ascertained or are unable to be ascertained via the conventional sensor technology for the partially or highly automated guidance of a vehicle, such as video or radar sensor systems. In this way it is possible to ascertain and utilize parking positions that are at least partially situated adjacent to the provided road, or in other words, outside the danger region.

According to one specific embodiment of the method, the lateral guidance is influenced only after a predefined speed value has been reached.

The predefined speed value is selected in such a way that an efficient departure from the danger area is ensured yet at the same time, no unnecessarily great risk is at hand that the vehicle will reach a region that is difficult to control in term of the driving dynamics.

According to an alternative or additional aspect, the lateral guidance is influenced only starting at a predefined distance from the expected standstill of the vehicle.

This is advantageous in that the vehicle is initially decelerated in conformance with expectations before its lateral guidance is modified in a manner that is not expected by other road users.

In one advantageous specific embodiment of the present method, once the parking position has been reached, the parking position is corrected in such a way that an evacuation space is created around the vehicle.

This specific embodiment effectively prevents what is known as "leaning" against a wall or guardrail. This could possibly make it more difficult to evacuate the vehicle or, in the extreme case, make it completely impossible.

According to one preferred specific embodiment of the present method, the parking position is ascertained as a function of signals from the chassis sensor system and/or the parking sensor system and/or the inertial sensor system, in particular the acceleration sensor system and/or the wheel-speed sensor system and/or the inclination sensor system of the vehicle.

Via the chassis sensor system, it can easily be ascertained whether the ground currently driven on is suitable as a parking position. A suitable parameter in this context is a measure for the unevenness of the driving surface.

With the aid of a spring-travel detector, for example, it can be determined on what kind of surface the vehicle is currently located; for instance, larger stones which point to travel on an unpaved path can be detected. The same applies to acceleration or tilt sensors installed in the vehicle. On the basis of acceleration signals, it is also possible to determine how even the ground surface is and whether driving on a paved road is currently taking place.

Using the parking sensor system, it is easy to ascertain whether, and how much, space is available around the vehicle, in particular in the area surrounding the front and rear sections of the vehicle. Furthermore, the parking sensor system is very well suited for detecting vegetation.

With the aid of the acceleration sensor system and, above all, the wheel-speed sensor system, the solidity of the ground surface can be ascertained. These sensor systems make it especially easy to determine whether an unpaved ground surface is at hand that may possibly not be suitable as a parking position.

Using tilt sensor systems, for instance in the form of rate-of-rotation sensors, it can easily be detected how uneven the used ground surface is. The gradient of the unevenness is ascertainable as well. This makes it uncomplicated to determine whether the used ground surface drops rapidly (such as in the case of a steep bank) and is therefore not suited as a parking position.

Utilizing the tilt sensors which, for example, are installed in the vehicle for detecting a rollover, i.e., an overturning of the vehicle, it is unproblematic to detect whether the vehicle is driving down a bank or, for instance, is already at a steep drop by two wheels.

By combining the information from parking and acceleration sensors, in particular from acceleration sensors for detecting collisions, it can be detected whether, or when, the road has been left, for instance by detecting the road edge or the curb edge (with the aid of the parking sensor system), and detecting the crossing of the road edge or curb edge by detecting the typical acceleration outliers.

It is furthermore possible that the vehicle determines the best and safest parking position possible such that the vehicle (intentionally) makes contact with objects or obstacles. A possibly existing surroundings sensor system operating on the basis of ultrasonic or video signals is normally unable to determine the mass of a detected object. A camera would detect vegetation such as a bush as an impenetrable obstacle through which the vehicle should not be driven. The use of the inertial sensor system, and in particular the use of the acceleration sensors, would allow the vehicle to slowly approach even uncertain objects if insufficient parking space is available. Depending on the parking resistance and the measured acceleration signal, it can thereby be determined what kind of object is at hand, or further driving through the object could take place, so that the parking location is even further removed from an existing danger zone.

In addition, it is possible that the free space around the vehicle is ascertained with the aid of the parking sensor system. Ascertaining the free space around the vehicle makes it possible to determine whether there is sufficient evacuation space around the vehicle based on a predefined minimum space, for example.

If the free space should be determined to be too small, then the parking location of the vehicle can be corrected appropriately, for instance through corresponding interventions in the longitudinal and lateral guidance of the vehicle.

The use of the corresponding sensors ensures a better interpretation of the surrounding area, thereby making it easier to determine a safe parking position.

In addition or as an alternative, the parking position may be ascertained as a function of information of a digital map.

A digital map is able to store information about areas that lie beyond the road. This information may be grouped together in the same way as the grouping of information via the vehicle sensor system in order to ascertain a suitable parking position for the vehicle.

According to one variant of the present method, the safety zone lies at least partially outside the road.

This variant increases the number of possible parking positions inasmuch as areas are taken into account for emergency stopping that are at least partially located outside the road. This contributes to greater road safety or to a reduced risk for the passengers of the vehicle and the other road users.

According to an expanded variant of the present method, the maximum driving distance beyond the road is predefined.

Because of this aspect, the danger to the passengers of the vehicle is reduced inasmuch as it is highly likely that locations that are suitable as a parking position for the present method are to be found within a predefined radius around a road. Driving the vehicle away from the road beyond this radius would increase the possibility that the vehicle will be guided into areas that are no longer suitable for driving by a vehicle.

As an alternative or in addition to the expanded variant, the vehicle is able to be driven below a predefined speed upon leaving the road.

A walking speed, for example, may be considered for a predefined speed.

In particular when providing low speed ranges, this variant offers the additional advantage that minimal collisions that may occur with objects or structures of the road or on the side of the road while determining a suitable parking position, would have barely any effect on the physical integrity of the vehicle passengers.

Furthermore, in addition to the sensors used for the partially or highly automated driving, it is also possible to use sensors that are operating in a contact-based manner. To be considered in this context are acceleration or pressure sensors which are typically used for impact detection.

One advantageous aspect of the present invention also includes precisely these additional sensors in the ascertainment of a suitable parking position in order to thereby broaden the spectrum of the available information for ascertaining a parking position.

According to one specific embodiment of the method, the vehicle is driven to the safety zone below a predefined speed, starting at a predefined distance.

According to this specific embodiment, the initial focus is on efficiently driving the vehicle away from the other traffic in the direction of a safety zone. In the area of the safety zone, it will then be necessary to ascertain a suitable parking position utilizing the (still) available sensor systems in the vehicle. To do so, the main objective is to give the involved system components sufficient time to sense the possible parking position and to develop a suitable navigation strategy for ultimately bringing the vehicle to a standstill in the ascertained parking position.

According to a further aspect of the method, the longitudinal guidance is influenced as a function of a predefined deceleration behavior.

In contrast to conventional emergency braking methods, it is not only the fastest possible elimination of kinetic energy that constitutes the main focus according to this aspect. Instead, the deceleration for the purpose of preventing an immediate endangerment of the passengers of the vehicle and the endangerment of the other road users is at the forefront, followed by parking the vehicle in a suitable parking position, where the vehicle is then to be parked as quickly as possible without further risk to the other traffic.

In this context, the longitudinal guidance of the vehicle, i.e., the deceleration, can initially be influenced in an optimal manner. An optimal influencing of the longitudinal guidance or deceleration results from the situation at hand and the subsequent selection of an optimal deceleration behavior.

According to one further specific embodiment of the present method for assisted emergency braking, the warning systems of the vehicle are activated.

In this instance, warning systems of the vehicle, among other things, may mean acoustical warning systems (such as the horn, siren), optical warning systems (lighting system, in particular hazard lights and headlamp flashers), and also warning messages via vehicle-to-vehicle or vehicle-to-infrastructure communication means (C2X communication means).

It is of course possible to develop the method such that it can be aborted at any time, for instance by a corresponding intervention in the longitudinal or lateral guidance, in particular an intervention on the part of the driver or other passengers of the vehicle, or also by the operation of a corresponding switching means. Such a switching means may be an emergency switch in the simplest form.

Another aspect of the present invention is a corresponding computer program as well as a machine-readable storage medium on which the computer program is stored.

In addition, the present invention includes a system that is set up to execute the steps of the method of the present invention.

In the following text, specific embodiments of the present invention are illustrated and explained with the aid of the figures.

BRIEF DESCRIPTION OF THE DRAWINGS

FIGS. 1a-c show situation illustrations of the steps of one specific embodiment of the present method.

DETAILED DESCRIPTION OF EXAMPLE EMBODIMENTS

Figure 1A:
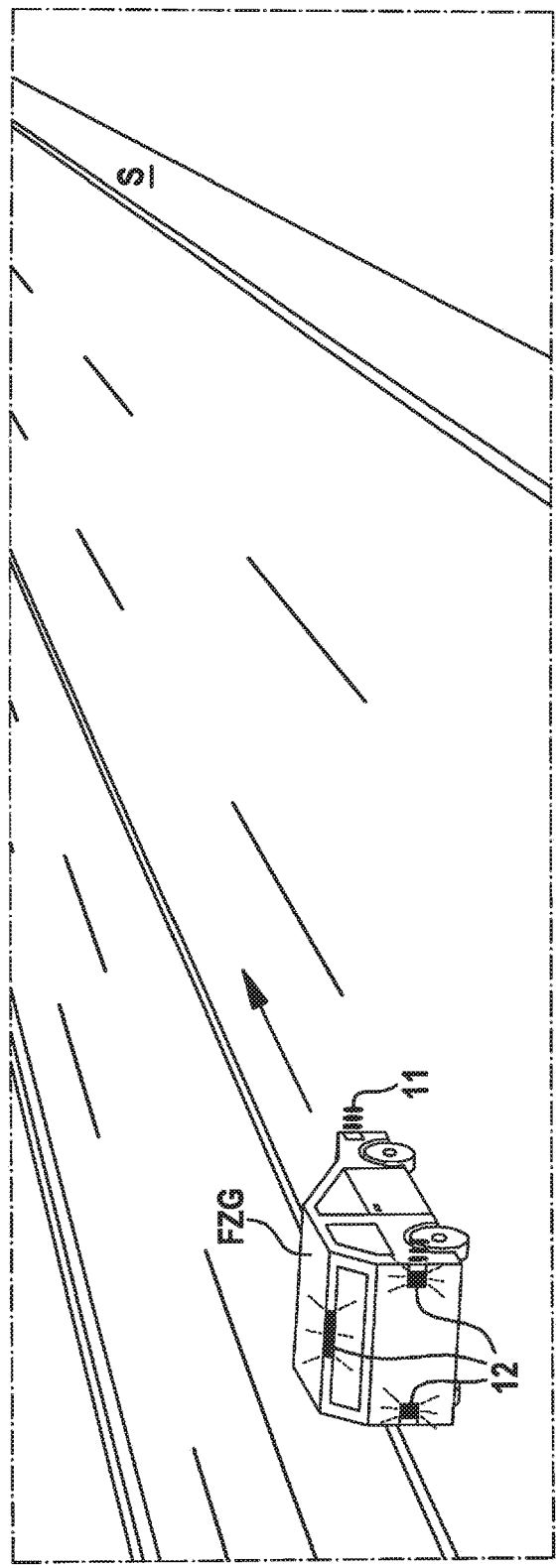

FIG. 1a shows a driving situation in which a vehicle FZG, which is equipped with a system according to the present invention, is undergoing assisted emergency braking according to method 200 of the present invention. The illustration shows the instant of triggering. When the situation that leads to triggering of the emergency braking function has occurred and is detected, the longitudinal guidance of vehicle FZG, among other things, is influenced to the effect that vehicle FZG is decelerated. This can be recognized by the illuminated brake lights 12. At the same time, the other road users are informed in conformance with expectations in that the turn signal light, i.e., blinker 11, is activated to indicate that vehicle FZG will move in the direction of a safety zone S. Also possible would be the activation of hazard lights such as a flashing blue light. In the illustrated situation, safety zone S is situated at the right road edge. Not able to be shown but also possible is that vehicle FZG operates additional signaling devices, for instance a horn or a siren, or transmits vehicle-to-vehicle or vehicle-to-infrastructure messages (C2X messages) via suitable communications means.

FIG. 1b shows a subsequent driving situation. Here, vehicle FZG was already decelerated and vehicle FZG has reached safety zone S. The vehicle now utilizes the available sensor functionality for ascertaining a safe parking position P. Not able to be shown in the figure but conceivable nevertheless, is that the ascertainment of the safe parking position takes place at a low level of speed. In addition, as shown, emergency flasher system 13 of the vehicle may be activated for the further warning of the other road users.

FIG. 1c shows an end situation of one specific embodiment, which is detected by the method of the present invention. Vehicle FZG has come to a standstill in a suitable parking position P. This parking position P is partially located outside the road. It is also possible that parking position P is situated completely outside of the road, i.e., completely adjacent to the road. Parking position P is ascertained via the (still) available vehicle sensors. Parameters such as the maximum unevenness of the parking area, the inclination of the parking area and also the remaining evacuation space around vehicle FZG, inter alia, play a role in the detection of a suitable parking position P. All of these parameters are able to be ascertained via the sensor systems of vehicle FZG. One aspect of the present invention relates to the utilization of information from as many sensor systems of vehicle FZG as possible in order to determine a suitable parking position P. In this particular example, it is detected with the aid of the acceleration sensors that the two right wheels of vehicle FZG have left the road. In addition, it is determined with the aid of the tilt sensor installed in vehicle FZG that vehicle FZG exhibits a slight inclination of vehicle FZG on account of a slight gradient of the grass strip next to the road. Since it is determined with the aid of the sensors that the area immediately abutting the road can be used for driving, at least at a low speed, vehicle FZG will not be parked on the road but partially parked on the grass strip. This reduces the risk of a possible accident with other road users traveling on the road.

According to one specific embodiment that is not shown, it is conceivable that once the initially ascertained parking position P has been reached, the parking position of vehicle FZG is corrected to allow sufficient evacuation space to remain around vehicle FZG. In this context it is also possible that the parking location of vehicle FZG is corrected again in the direction of the road that was left.

Figure 2:
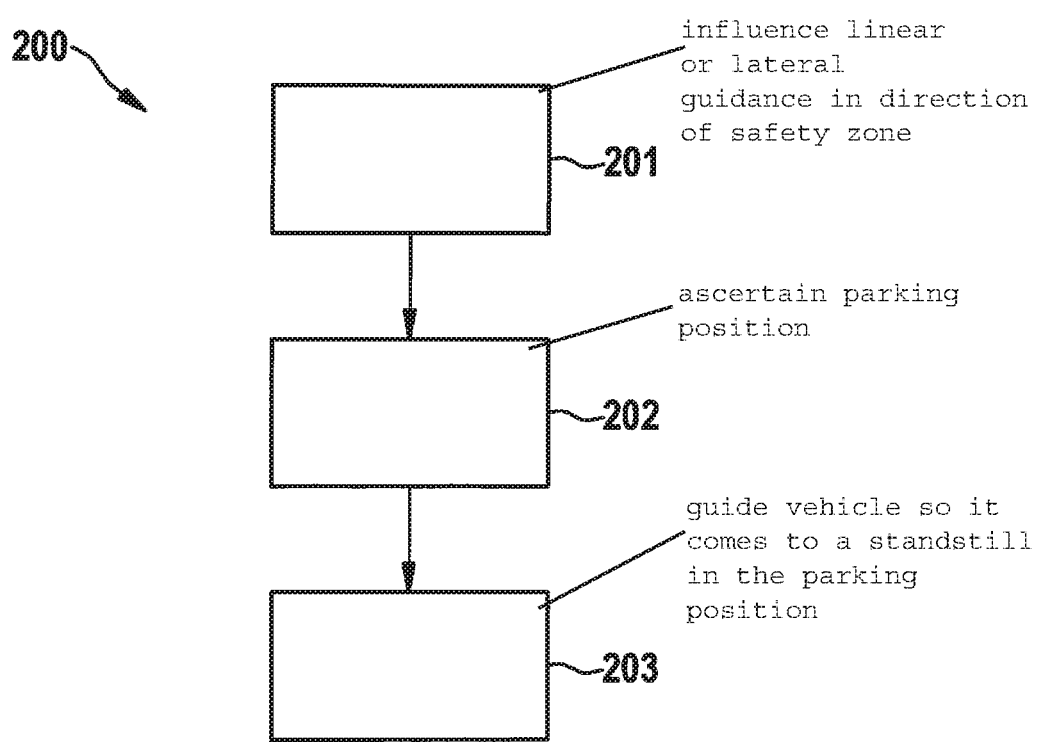
FIG. 2 shows a flow diagram of one specific embodiment of the method of the present invention.

FIG. 2 shows a flow chart of one specific embodiment of method 200 of the present invention.

In method step 201, the linear or lateral guidance of the vehicle is influenced in such a way that the vehicle is guided in the direction of a safety zone.

In method step 202, when the vehicle has reached the safety zone, a parking position is ascertained for the vehicle. To ascertain the parking position, as much information as possible is combined via the (still) available sensor systems of the vehicle in order to ascertain a suitable parking position for the vehicle, so that the endangerment of the passengers of the vehicle and of the other road users is kept to a minimum.

In method step 203, the vehicle is finally guided in such a way that the vehicle comes to a standstill in the parking position.

What is claimed is:

1. A method for assisted emergency braking of a vehicle, the method comprising:
    in response to a predefined triggering event occurring while the vehicle is traveling in a lane of a road:
        controlling, by a processor of the vehicle, a driving system of the vehicle to steer the vehicle into a safety zone that is external to the lane;

responsive to entering the safety zone, obtaining, by the processor and from at least one sensor of the vehicle, at least one sensor signal;

based on the obtained sensor signal, determining, by the processor, at least one feature of an area in an environment surrounding the vehicle in the safety zone;

based on the determined at least one feature, identifying, by the processor, that the area is suitable as a parking position of the vehicle within the safety zone; and responsive to the identification of the suitability of the area, the processor controlling a braking system of the vehicle to decelerate the vehicle to a standstill in the area;

wherein the at least one sensor includes an acceleration sensor and at least one of:

(a) (i) the identifying includes (1) the processor controlling the driving system to guide the vehicle into an object sensed by the vehicle to be in the safety zone, (2) the acceleration sensor producing, as at least one of the at least one sensor signal, an acceleration signal in response to an impact by the sensed object on the vehicle due to the guidance of the vehicle into the object, and (3) the processor determining a characteristic of the object based on the acceleration signal produced in response to the impact by the sensed object on the vehicle, and (ii) the method further comprises, based on the determined characteristic of the object, the processor controlling the driving system to drive the vehicle further into the object to reach the area at which the vehicle is brought to the standstill; and (b)(i) the identifying includes (1) the processor controlling the driving system to drive the vehicle over a ground surface in the safety zone, (2) the acceleration sensor producing, as at least one of the at least one sensor signal, an acceleration signal in response to movements of the vehicle caused by the ground surface, (3) the processor determining a solidity of the ground surface based on the acceleration signal produced in response to the movements of the vehicle caused by the ground surface, and (4) the processor determining that the ground surface is suitable for parking of the vehicle based on the determined solidity.

2. The method as recited in claim 1, wherein the controlling of the driving system to steer the vehicle into the safety zone in response to the predefined triggering event is performed only if the vehicle is below a predefined speed.

3. The method as recited in claim 1, wherein the controlling of the driving system to steer the vehicle into the safety zone in response to the predefined triggering event is performed only if the vehicle is within a predefined distance from the safety zone.

4. The method as recited in claim 1, wherein the controlling by the processor to bring the vehicle to the standstill in the area is performed such that there is an evacuation space around the vehicle.

5. The method as recited in claim 1, wherein the at least one sensor from which the at least one signal, on the basis on which the processor determined the at least one feature of the area, is obtained by the processor further includes at least one of a chassis sensor system, a parking sensor system, an inertial sensor system, a wheel speed sensor system, and a tilt sensor system of the vehicle.

6. The method as recited in claim 1, further comprising identifying a point as an external lateral edge of the road, wherein the method is performed according to a condition that the area must be within a predefined distance from the identified external lateral edge of the road.

7. The method as recited in claim 1, further comprising the processor controlling the braking system to slow the vehicle to below a predefined speed once the vehicle reaches a position whose lateral distance to the safety zone is below a predefined distance.

8. The method as recited in claim 1, further comprising:
activating warning systems of the vehicle during the assisted emergency braking.

9. The method as recited in claim 1, wherein (i) the identifying includes (1) the processor controlling the driving system to guide the vehicle into the object sensed by the vehicle to be in the safety zone, (2) the acceleration sensor producing the acceleration signal in response to the impact by the sensed object on the vehicle due to the guidance of the vehicle into the object, and (3) the processor determining the characteristic of the object based on the acceleration signal produced in response to the impact by the sensed object on the vehicle, and (ii) the method further comprises, based on the determined characteristic of the object, the processor controlling the driving system to drive the vehicle further into the object to reach the area at which the vehicle is brought to the standstill.

10. The method as recited in claim 9, wherein the method further comprises the processor controlling the braking system to slow the vehicle down to a first speed, and the guidance of the vehicle into the object is performed while the vehicle is driving at the first speed due to the slowing of the vehicle.

11. The method as recited in claim 10, further comprising, in response to the predefined triggering event occurring while the vehicle is traveling in a lane of a road, controlling, by the processor and prior to the vehicle reaching the safety zone, the braking system of the vehicle to slow the vehicle down to a second speed, wherein the first speed is slower than the second speed.

12. The method as recited in claim 1, wherein (i) the identifying includes (1) the processor controlling the driving system to drive the vehicle over the ground surface in the safety zone, (2) the acceleration sensor producing the acceleration signal in response to the movements of the vehicle caused by the ground surface, (3) the processor determining the solidity of the ground surface based on the acceleration signal produced in response to the movements of the vehicle caused by the ground surface, and (4) the processor determining that the ground surface is suitable for the parking of the vehicle based on the determined solidity.

13. The method as recited in claim 12, wherein the method further comprises the processor controlling the braking system to slow the vehicle down to a first speed, and the driving of the vehicle over the ground surface is performed while the vehicle is driving at the first speed due to the slowing of the vehicle.

14. The method as recited in claim 13, further comprising, in response to the predefined triggering event occurring while the vehicle is traveling in a lane of a road, controlling, by the processor and prior to the vehicle reaching the safety zone, the braking system of the vehicle to slow the vehicle down to a second speed, wherein the first speed is slower than the second speed.

15. A non-transitory machine-readable storage medium on which is stored a computer program for assisted emergency braking of a vehicle, the computer program, when executed by a processor of the vehicle, causing the processor to perform a method, the method comprising:
  in response to a predefined triggering event occurring while the vehicle is traveling in a lane of a road:
    controlling a driving system of the vehicle to steer the vehicle into a safety zone that is external to the lane;
    upon entering the safety zone, obtaining, from at least one sensor of the vehicle, at least one sensor signal;
    based on the obtained sensor signal, determining at least one feature of an area in an environment surrounding the vehicle in the safety zone;
    based on the determined at least one feature, identifying that the area is suitable as a parking position of the vehicle within the safety zone; and
    responsive to the identification of the suitability of the area, controlling a braking system of the vehicle to decelerate the vehicle to a standstill in the area;
  wherein the at least one sensor includes an acceleration sensor and at least one of:
    (a) (i) the identifying includes (1) the processor controlling the driving system to guide the vehicle into an object sensed by the vehicle to be in the safety zone, (2) the acceleration sensor producing, as at least one of the at least one sensor signal, an acceleration signal in response to an impact by the sensed object on the vehicle due to the guidance of the vehicle into the object, and (3) the processor determining a characteristic of the object based on the acceleration signal produced in response to the impact by the sensed object on the vehicle, and (ii) the method further comprises, based on the determined characteristic of the object, controlling the driving system to drive the vehicle further into the object to reach the area at which the vehicle is brought to the standstill; and
    (b)(i) the identifying includes (1) the processor controlling the driving system to drive the vehicle over a ground surface in the safety zone, (2) the acceleration sensor producing, as at least one of the at least one sensor signal, an acceleration signal in response to movements of the vehicle caused by the ground surface, (3) the processor determining a solidity of the ground surface based on the acceleration signal produced in response to the movements of the vehicle caused by the ground surface, and (4) the processor determining that the ground surface is suitable for parking of the vehicle based on the determined solidity.

16. A system for the assisted emergency braking of a vehicle, the system comprising:
  a braking system of the vehicle;
  a driving system of the vehicle;
  at least one sensor of the vehicle; and
  a processor of the vehicle;
wherein:
  the processor is configured to:
    in response to a predefined triggering event occurring while the vehicle is traveling in a lane of a road:
      control the driving system to steer the vehicle into a safety zone that is external to the lane;
      upon entering the safety zone, obtain at least one sensor signal from the at least one sensor;
      based on the obtained sensor signal, determine at least one feature of an area in an environment surrounding the vehicle in the safety zone;
      based on the determined at least one feature, identify that the area is suitable as a parking position of the vehicle within the safety zone; and
      responsive to the identification of the suitability of the area, control the braking system to decelerate the vehicle to a standstill in the area;
  the at least one sensor includes an acceleration sensor; and
  at least one of:
    (a) (i) the identification includes (1) the processor controlling the driving system to guide the vehicle into an object sensed by the vehicle to be in the safety zone, (2) the acceleration sensor producing, as at least one of the at least one sensor signal, an acceleration signal in response to an impact by the sensed object on the vehicle due to the guidance of the vehicle into the object, and (3) the processor determining a characteristic of the object based on the acceleration signal produced in response to the impact by the sensed object on the vehicle, and (ii) the processor is configured to, based on the determined characteristic of the object, control the driving system to drive the vehicle further into the object to reach the area at which the vehicle is brought to the standstill; and
    (b)(i) the identification includes (1) the processor controlling the driving system to drive the vehicle over a ground surface in the safety zone, (2) the acceleration sensor producing, as at least one of the at least one sensor signal, an acceleration signal in response to movements of the vehicle caused by the ground surface, (3) the processor determining a solidity of the ground surface based on the acceleration signal produced in response to the movements of the vehicle caused by the ground surface, and (4) the processor determining that the ground surface is suitable for parking of the vehicle based on the determined solidity.

* * * * *